(12) United States Patent
Klein

(10) Patent No.: US 8,908,701 B2
(45) Date of Patent: Dec. 9, 2014

(54) STREAM PATH SELECTION WITHIN CONVERGENT NETWORKS

(75) Inventor: Philippe Klein, Jerusalem (IL)

(73) Assignee: Broadcom Corporation, Irvine, CA (US)

(*) Notice: Subject to any disclaimer, the term of this patent is extended or adjusted under 35 U.S.C. 154(b) by 263 days.

(21) Appl. No.: 13/334,328

(22) Filed: Dec. 22, 2011

(65) Prior Publication Data

US 2012/0236870 A1    Sep. 20, 2012

Related U.S. Application Data

(60) Provisional application No. 61/452,622, filed on Mar. 14, 2011, provisional application No. 61/452,627, filed on Mar. 14, 2011.

(51) Int. Cl.
| | |
|---|---|
| *H04L 12/54* | (2013.01) |
| *H04L 12/28* | (2006.01) |
| *G06F 15/177* | (2006.01) |
| *G06F 15/173* | (2006.01) |
| *H04L 12/721* | (2013.01) |
| *H04L 12/761* | (2013.01) |
| *H04L 12/66* | (2006.01) |

(52) U.S. Cl.
CPC ............. *H04L 45/66* (2013.01); *H04L 12/66* (2013.01); *H04L 45/16* (2013.01); *Y02B 60/43* (2013.01)
USPC ........... 370/401; 370/351; 370/465; 709/220; 709/238

(58) Field of Classification Search
CPC ............................. H04L 12/66; H04L 2012/46
USPC ....................................................... 370/401
See application file for complete search history.

(56) References Cited

U.S. PATENT DOCUMENTS 6,115,750 A * 9/2000 Dillon et al. ............ 709/235
2007/0245033 A1 10/2007 Gavrilescu
(Continued)

FOREIGN PATENT DOCUMENTS

WO    2010094595 A1    8/2010

OTHER PUBLICATIONS

European Search Report; EP Application No. 12001547.4-2416; Jul. 2, 2012; 4 pgs.

(Continued)

*Primary Examiner* — Faruk Hamza
*Assistant Examiner* — Abu-Sayeed Haque
(74) *Attorney, Agent, or Firm* — Garlick & Markison; Shayne X. Short

(57) ABSTRACT

Stream path selection within convergent networks. Any one or more different types of metrics (e.g., related to any one or more of delay, packet error rate (PER), link bit rate stability, etc.) may be attached to/associated with various messages communicated within such a convergent network. Such messages may correspond to talker advertise (TA) messaging session relay protocol data units (MSRPDUs). Messages may be advertised over each of or a number of different respective communication links. A communication path, which may be composed of a number of different respective communication links between respective communication devices such that each respective communication link has an associated at least one metric, maybe characterized using one or more of the metrics associated with those different respective communication links. A metric of the communication path may be associated with a relatively lowest metric of the different respective communication links composing the communication path.

20 Claims, 18 Drawing Sheets

(56) References Cited

U.S. PATENT DOCUMENTS

| | | | |
|---|---|---|---|
| 2009/0116404 A1* | 5/2009 | Mahop et al. | 370/254 |
| 2010/0150020 A1* | 6/2010 | Rosen et al. | 370/254 |
| 2010/0238798 A1* | 9/2010 | Ahuja et al. | 370/225 |
| 2011/0038381 A1 | 2/2011 | Oren | |
| 2011/0286450 A1* | 11/2011 | Wijnands | 370/390 |

OTHER PUBLICATIONS

European Search Report; EP Application No. 12001548.2-2416; Aug. 1, 2012; 3 pgs.

IEEE Standard for Local and metropolitan area networks; Virtual Bridged Local Area Networks, Amendment 14: Stream Reservation Protocol (SRP); IEEE Std. 802.1Qat-2010, (Amendment to IEEE Std 802.1Q-2005), Sep. 30, 2010, 118 pgs.

Nowak, Stefan, "Enabling Convergent Digital Home Networks for Heterogeneous Technoligies", 3rd Omega Open Event 2011 Inter-Mac, Feb. 24, 2011, pp. 1-94.

IEEE Draft; Liaison-P1905-1-to-802-1-0111, IEEE-SA, Piscatawny, NJ, US, vol. 802.1, Jan. 17, 2011, p. 1.

* cited by examiner

SRP stream redundant path selection with single point of failure (2)

1701 within a listener or destination device, receiving at least one talker advertise (TA) messaging session relay protocol data unit (MSRPDU) from a talker or source device 1711 within the listener or destination device, processing the at least one TA MSRPDU in accordance with selecting at least one communication pathway for supporting communications between the talker or source device and the listener or destination device 1721 employing at least two selected communication pathways for jointly supporting redundant communications between the talker or source device and the listener or destination device 1731

FIG. 17B

1700 via an input/output port of a first communication device, receiving a plurality of messages, such that each of the plurality of messages associated with a respective at least one of a plurality of attributes and each of the plurality of messages also associated with a respective at least one of a plurality of communication links corresponding to a plurality of communication paths between the first communication device and a second communication device 1710 processing the plurality of messages in accordance with selecting at least one of the plurality of communication pathways for supporting communications between the first communication device and the second communication device 1720

FIG. 17A

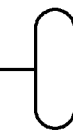

1800 within a listener or destination device, receiving at least one TA MSRPDU from a talker or source device 1810 within the listener or destination device, processing the at least one TA MSRPDU in accordance with selecting at least one communication pathway for supporting communications between the talker or source device and the listener or destination device 1820 from the listener or destination device, transmitting at least one listener ready (LR) MSRPDU to the talker or source device thereby creating a communication path composed of multiple communication links between the talker or source device and the listener or destination device 1830

FIG. 18A

1801 within a listener or destination device, receiving multiple TA MSRPDUs for a given stream through multiple ports 1811 within the listener or destination device, analyzing metrics associated with the respective multiple TA MSRPDUs in accordance with selecting one of the ports 1821 from the listener or destination device, transmitting at least one listener ready (LR) MSRPDU to the talker or source device, via the selected port, thereby creating a communication path composed of multiple communication links between the talker or source device and the listener or destination device 1831

STREAM PATH SELECTION WITHIN CONVERGENT NETWORKS

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:
1. U.S. Provisional Patent Application Ser. No. 61/452,622, entitled "Convergent network topology discovery and mapping," filed Mar. 14, 2011.
2. U.S. Provisional Patent Application Ser. No. 61/452,627, entitled "Stream path selection within convergent networks," filed Mar. 14, 2011.

Incorporation by Reference

The following U.S. Utility patent applications are hereby incorporated herein by reference in their entirety and made part of the present U.S. Utility patent application for all purposes:
"1. U.S. Utility patent application Ser. No. 13/334,245, entitled "Convergent network topology discovery and mapping," filed concurrently on Dec. 22, 2011.
2. U.S. Utility patent application Ser. No. 13/334,414, entitled "Convergent network architecture and path information," filed concurrently on Dec. 22, 2011."

Incorporation by Reference

The following IEEE standards/IEEE draft standards are hereby incorporated herein by reference in their entirety and are made part of the present U.S. Utility patent application for all purposes:
1. IEEE Std 802.1AB™-2009 (Revision of IEEE Std 802.1AB™-2005), IEEE Standard for Local and Metropolitan Area Networks—Station and Media Access Control Connectivity Discovery, IEEE Computer Society, Sponsored by the LAN/MAN Standards Committee, 17 Sep. 2009, 204 pages.
2. IEEE P802.1Q-REV/D1.5, March 2011, IEEE Approved Draft Standard for Local and Metropolitan Area Networks—Media Access Control (MAC) Bridges and Virtual Bridged Local Area Networks, 29 Aug. 2011, 1376 pages.
3. IEEE P1905.1™/D01.00, 13 Dec. 2011, 1905_1-11-0101-00-WGDC CDHN, IEEE P1905.1™/D01.00 Draft Standard for Convergent Digital Home Network for Heterogeneous Technologies, Sponsor: Standards Committee of the IEEE Communications Society, IEEE-SA Standards Board, Prepared by the P1905.1 Working Group of the IEEE Communications Society, 79 total pages.

BACKGROUND OF THE INVENTION

1. Technical Field of the Invention

The invention relates generally to communication systems; and, more particularly, it relates to convergent networks composed of any number of different respective network types.

2. Description of Related Art

Data communication systems have been under continual development for many years. One particular type of communication system is particularly related to heterogeneous networking technologies which may be implemented in accordance with home networking technologies. For example, within certain such network environments, as few as one or two or more different types of different respective network technologies may be implemented in accordance with a common abstract layer for supporting communications among such different network technologies.

As an example, different types of networks that may be implemented within such a heterogeneous networking technology environment may be varied. In addition, while it is noted that such different types of networks may be implemented within such a heterogeneous networking technology environment, the present art does not provide a means by which different respective networks may operate effectively and seamlessly with respect to another. For example, within any one respective network, there may be multiple respective communication links therein. Moreover, different respective networks may interface with respect to one another at more than one node or point.

The prior art fails to provide for effective operation of such heterogeneous networking technologies in regards to a number of issues including considerations such as network management, neighbor discovery, topology discovery, path selection, network control and management. While research and development continues in attempts to address these and other deficiencies within such convergent networks employing heterogeneous technologies, the prior art does not adequately provide acceptable solutions to allow for high levels of performance and broad implementation of such convergent networks.

BRIEF DESCRIPTION OF THE SEVERAL VIEWS OF THE DRAWINGS

FIG. 17A, FIG. 17B, FIG. 18A, and FIG. 18B illustrate various embodiment of methods for operating one or more devices within a convergent network.

DETAILED DESCRIPTION OF THE INVENTION

Figure 1:
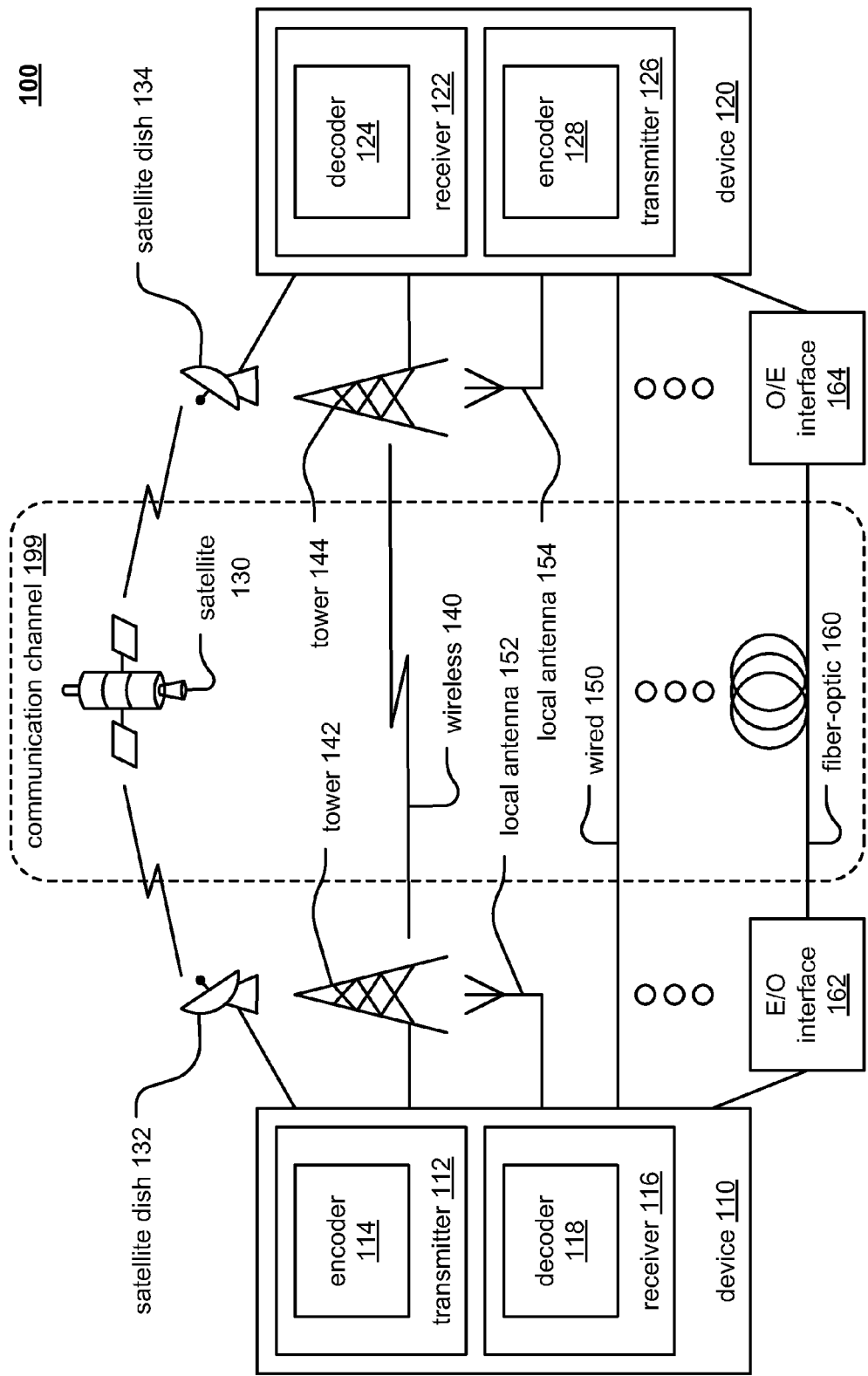
FIG. 1, FIG. 2, FIG. 3, and FIG. 4 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

FIG. 1, FIG. 2, FIG. 3, and FIG. 4 illustrate various embodiments of communication systems, 100, 200, 300, and 400, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Figure 2:
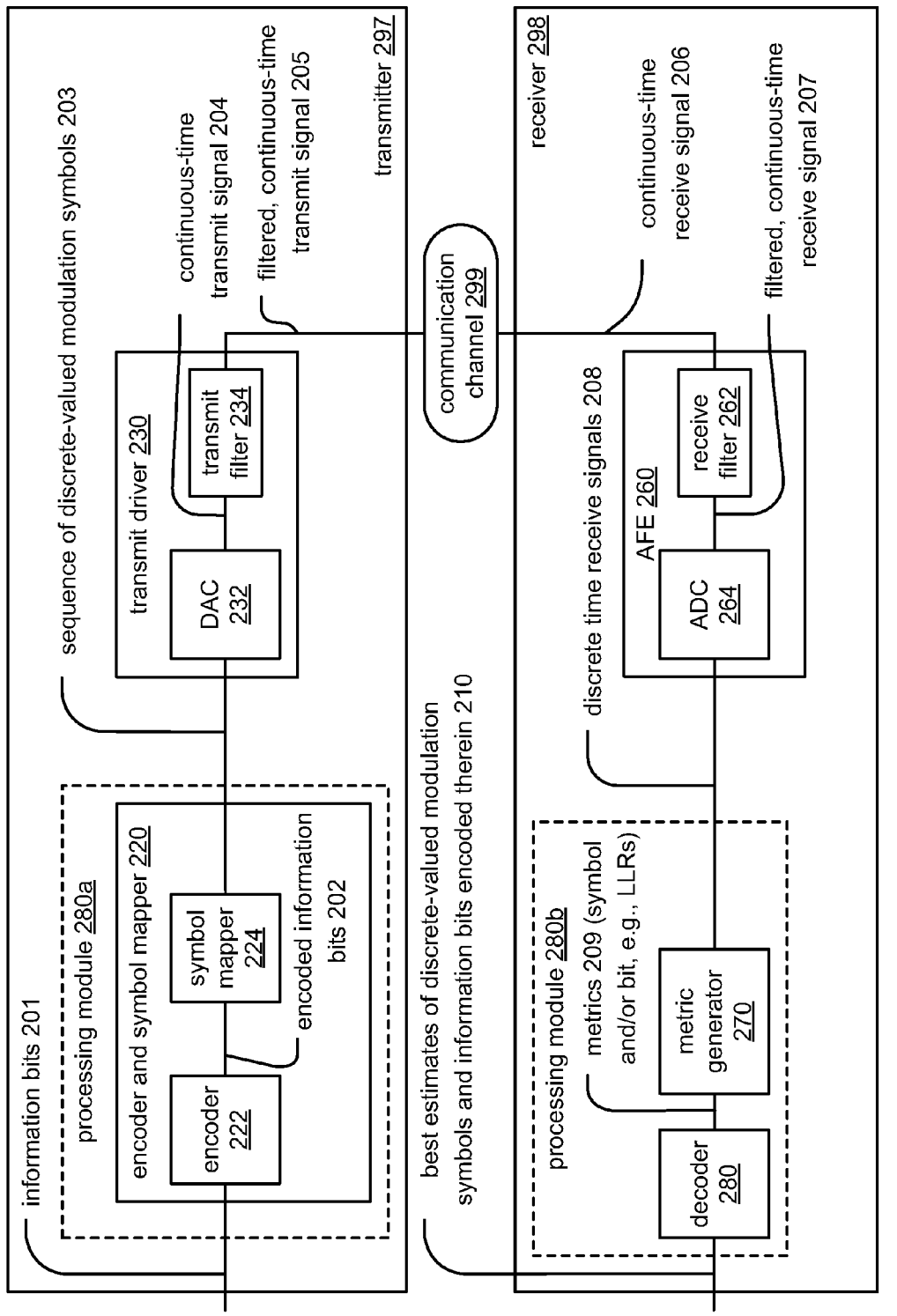

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
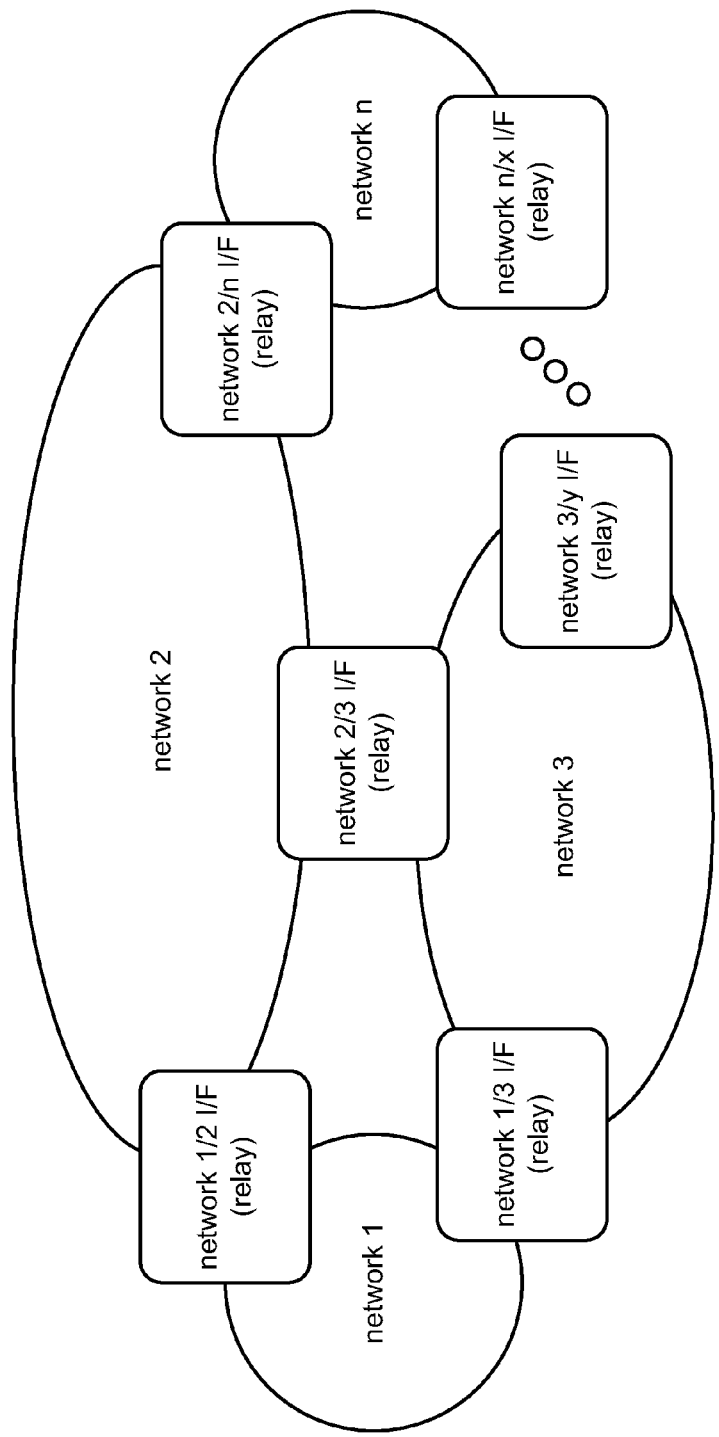

Referring to the embodiment 300 of FIG. 3, such a communication system may generally be viewed as including multiple networks that can interface with each other. Generally speaking, such an embodiment 300 can include a network 1, a network 2, a network 3, and so on up to a network n (e.g., where n is an integer). Such an overall communication system, composed of multiple networks, can generally be referred to as a convergent network (e.g., in which multiple networks are converged with one another thereby generating or forming a larger communication system, namely, a convergent network).

To interface communications between the respective networks, certain interfaces (e.g., relays) may be implemented within certain communication devices that are operative to communication with at least two of the types of network. In some embodiments, a given communication device may include functionality to interface with more than two networks (e.g., 3 networks, 4, networks, etc.). As may be seen in the diagram, an interface by which communications are made between two of the networks is via a network interface (or relay). As some specific examples, communications made between network 1 and network 2 are made via network 1/2 interface (or relay); communications made between network 1 and network 3 are made via network 1/3 interface (or relay); communications made between network n and network x are made via network n/x interface (or relay); and so on.

Generally speaking, for a communication device to support communications with more than one network will typically result in greater functionality and/or complexity of such a communication device. In some embodiments, a given communication device includes functionality to interface with and support communications with, at most, two of the networks within the overall communication system or convergent network.

Of course, some of the communication devices therein only include functionality to interface with and support communications with one of the networks within the overall communication system or convergent network. When such a communication device (e.g., one including functionality to interface with and support communications with one of the networks) communicates with another communication device including functionality to interface with and support communications with another one of the networks, such communications are made via at least one interface (or relay) by which communications are made from one network to another.

The types of networks that the networks 1 to n may represent may be varied. For examples, such networks may be wired networks, wireless network, optical networks, cellular networks, satellite networks, power line based networks, etc. Of course, certain of these networks may not only operate in accordance with different types of media (e.g., wired, wireless [air], optical, etc.), but certain of these networks may operate in accordance with different communication standards, protocols, and/or recommended practices.

Figure 4:
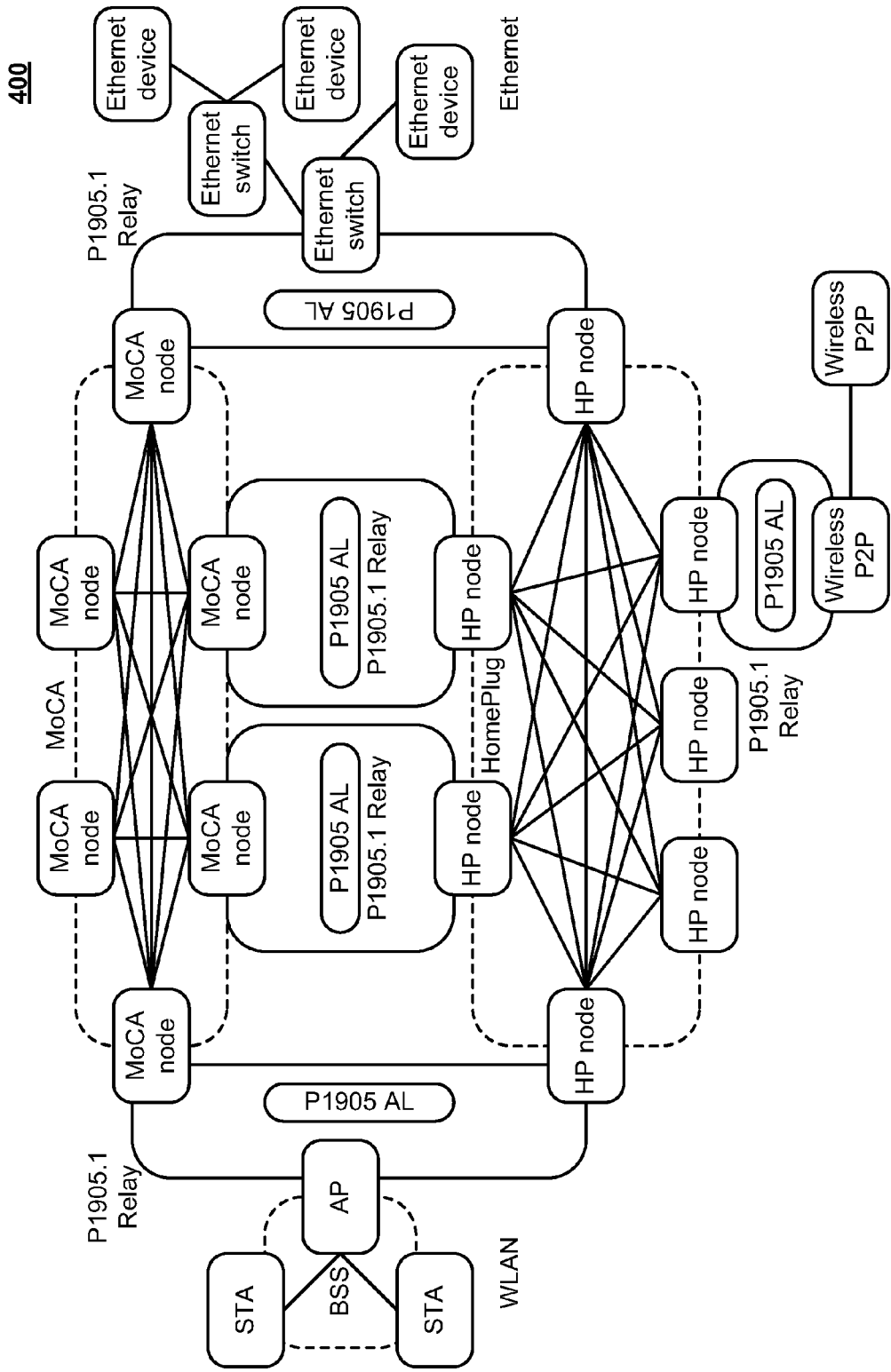

Referring to the embodiment 400 of FIG. 4, such a communication system is a convergent network including interfacing and supporting of communications between various types of communication networks. This diagram particularly depicts a wireless local area network (WLAN/WiFi), a multimedia over coax alliance (MoCA®, or generally referred to as MoCA) network, a local area network (LAN) such as one that operates in accordance with Ethernet or in accordance with IEEE 802.3, a HomePlug network (e.g., a communication network operating in accordance with various power line communication standards, protocols, and/or recommended practices and can operate using power system related hardware and infrastructure), and/or a wireless point to point (P2P) system (shown as Wireless P2P in the diagram).

Various communication devices are operative to support communications with more than one of these various network types within the overall communication system or convergent network. Such communication devices may generally be referred to as relays that perform the appropriate conversion, transcoding, interfacing, etc. of signals received from and compliant with a first type of network in accordance with generating signals compliant with a second type of network; such a relay then forwards the newly generated signal via the second type of network. It is also noted that such relay functionality may be included within any desired communication device within the convergent network. While certain relays may be dedicated relays within the convergent network, any such type of communication device within the convergent network may include such relaying or interfacing functionality therein.

Of course, certain communications may be transmitted across multiple network interfaces and, as such, may undergo appropriate processing in accordance with more than one relay (e.g., from a first type of network to a second type of network, then from the second type of network to a third second type of network, etc.).

In certain communication devices that includes such relaying or interfacing functionality therein, a P1905.1 Layer may be implemented above the respective media access control (MAC) layers corresponding to two or more network types. For example, a P1905.1 Layer may be implemented above a first MAC layer corresponding to a WLAN and also above a second MAC layer corresponding to a MoCA network. Alternatively, a P1905.1 Layer may be implemented above a first MAC layer corresponding to a LAN or Ethernet network and also above a second MAC layer corresponding to a HomePlug network. Generally, for a relay device, such a P1905.1 Layer may be implemented above at least two MAC layers corresponding respectively to at least two types of networks within the convergent network. Of course, for a terminal device (e.g., one not implemented to effectuate relaying of frames between two or more interfaces), such a P1905.1 Layer may be implemented over a single MAC layer corresponding to one of the types of networks within the convergent network. In some embodiments, such a terminal device may also be implemented using a P1905.1 layer to allow the device to be seen as a P1905.1 device and to be controlled by the P1905.1 network management entity in accordance with a P1905.1 control protocol (e.g., so that the device will not be seen as a legacy device in the convergent network).

Figure 5:
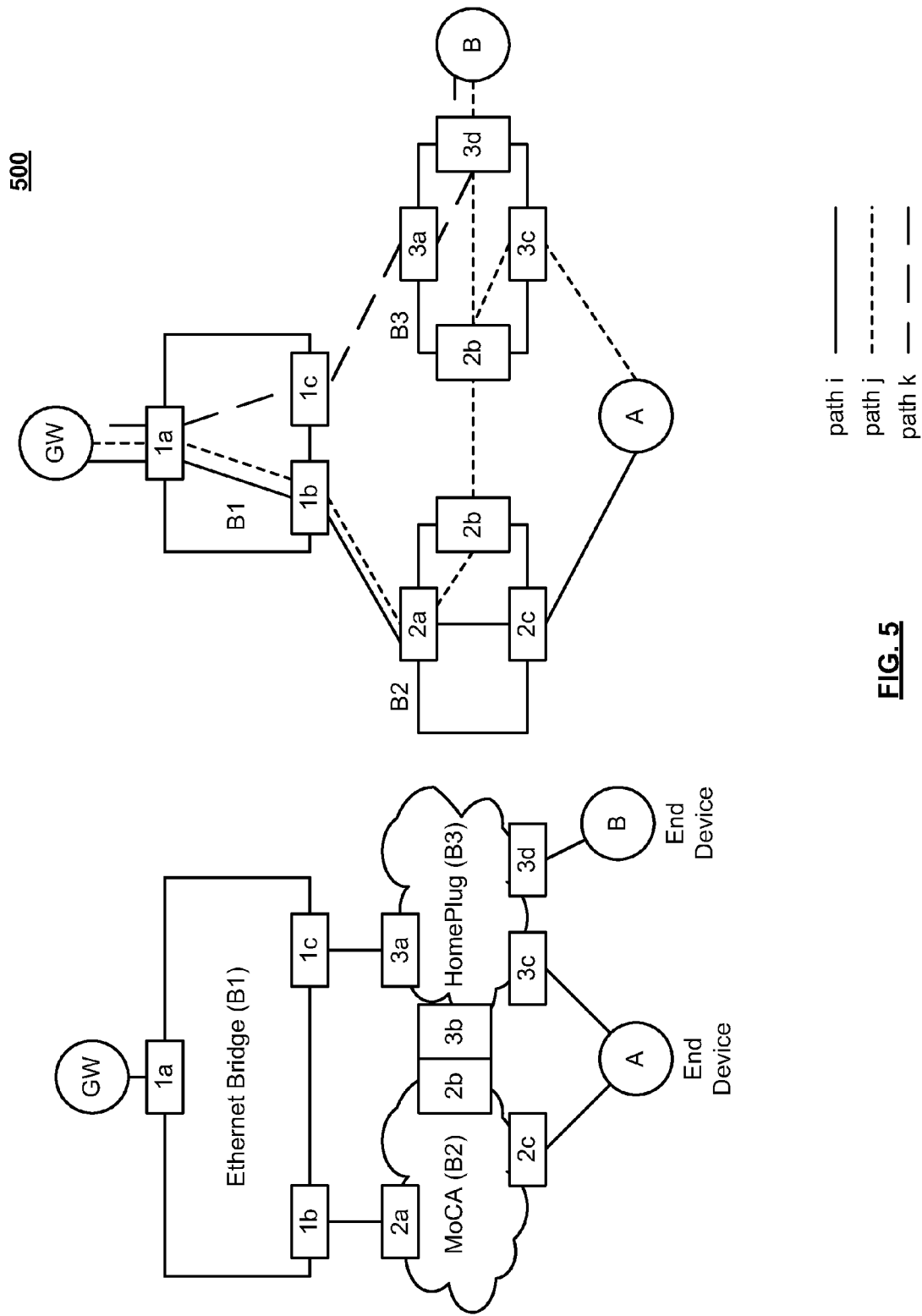
FIG. 5 illustrates an embodiment of a convergent network (such as a convergent digital home network (CDHN)) and multiple paths that are available for communicating between respective communication devices therein.

FIG. 5 illustrates an embodiment 500 of a convergent network (such as a convergent digital home network (CDHN)) and multiple paths that are available for communicating between respective communication devices therein. As may be understood within a convergent network, various types of network may be in communication with respect to each other. Oftentimes, a first communication device can communicate with a second communication device within the convergent network via more than one path within the convergent network. That it so say, in some embodiments of a convergent network, there exists more than one path by which communication may be supported between two communication device therein (and such multiple paths may pass via different networks within the convergent network).

Considering the embodiment 500 of this diagram, respective communications between a gateway (GW) and end communication devices A and B may be effectuated via more than one path. As may be seen in this diagram, multiple network types (e.g., an Ethernet network, a MoCA network, and a HomePlug network) are implemented conjunctively thereby forming a convergent network. Via the respective interfaces (or relays) by which the various networks within the convergent network interact with each other, more than one communication path may be employed to effectuate communications between the GW and the end communication devices A and B.

Figure 6:
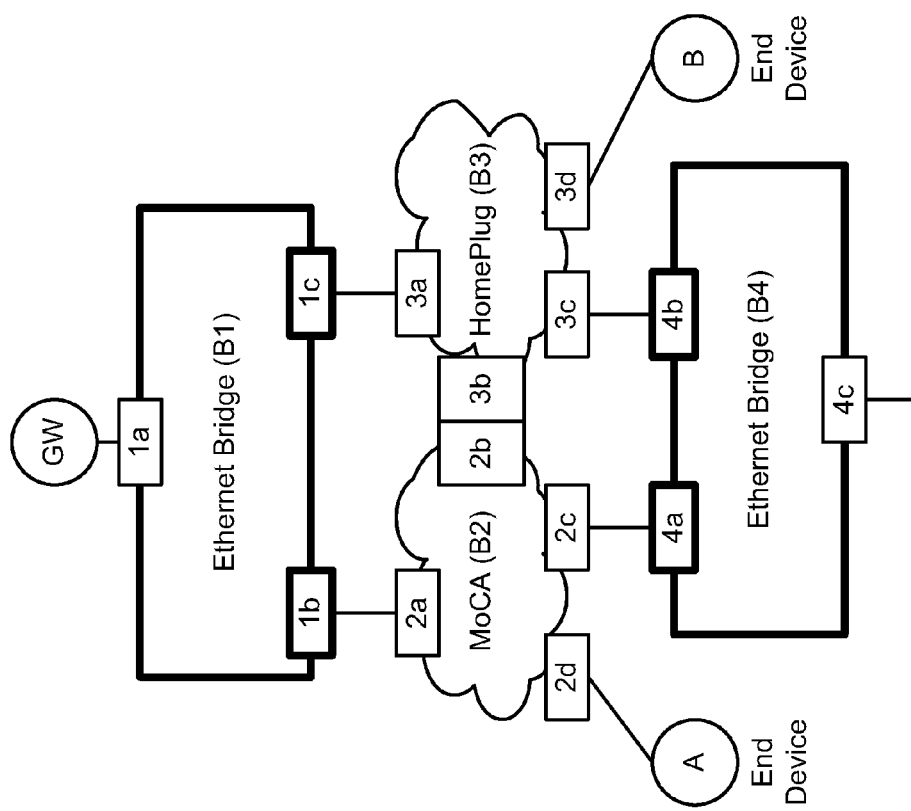
FIG. 6 illustrates an embodiment of potential loops as may exist within a convergent network.

FIG. 6 illustrates an embodiment 600 of potential loops as may exist within a convergent network. Loop protection should generally be protected against within convergent networks. For example, when more than one interface is employed between two types of networks within the convergent network, loops may undesirably exist within the overall convergent network.

Figure 7:
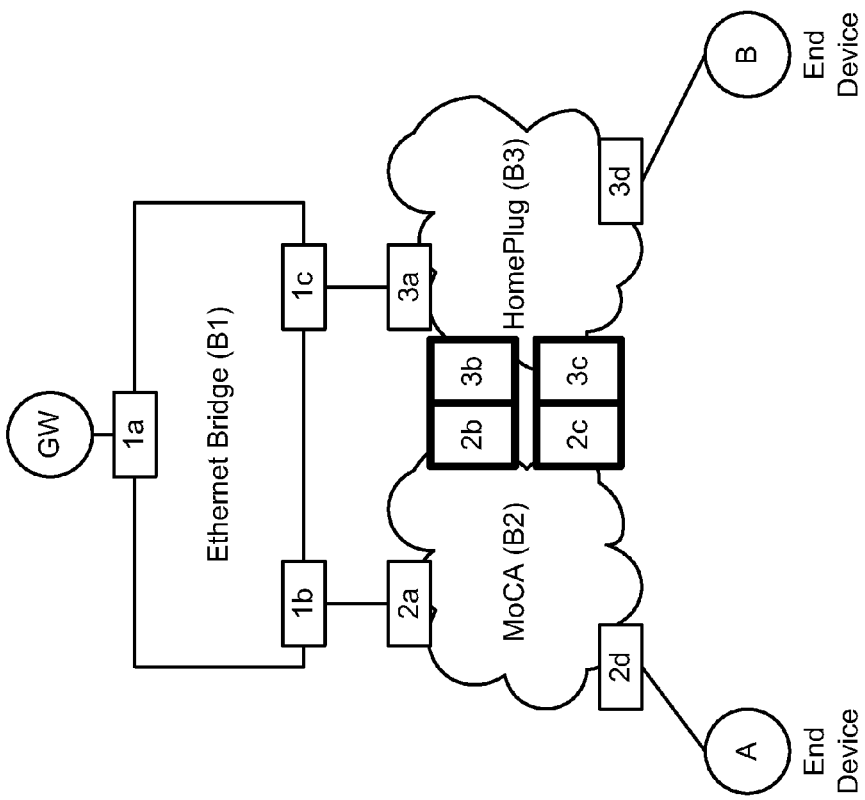
FIG. 7 illustrates another embodiment of potential loops as may exist within a convergent network.

FIG. 7 illustrates another embodiment 700 of potential loops as may exist within a convergent network. This embodiment 700 also shows another situation in which loops may undesirably exist within the overall convergent network.

Figure 8:
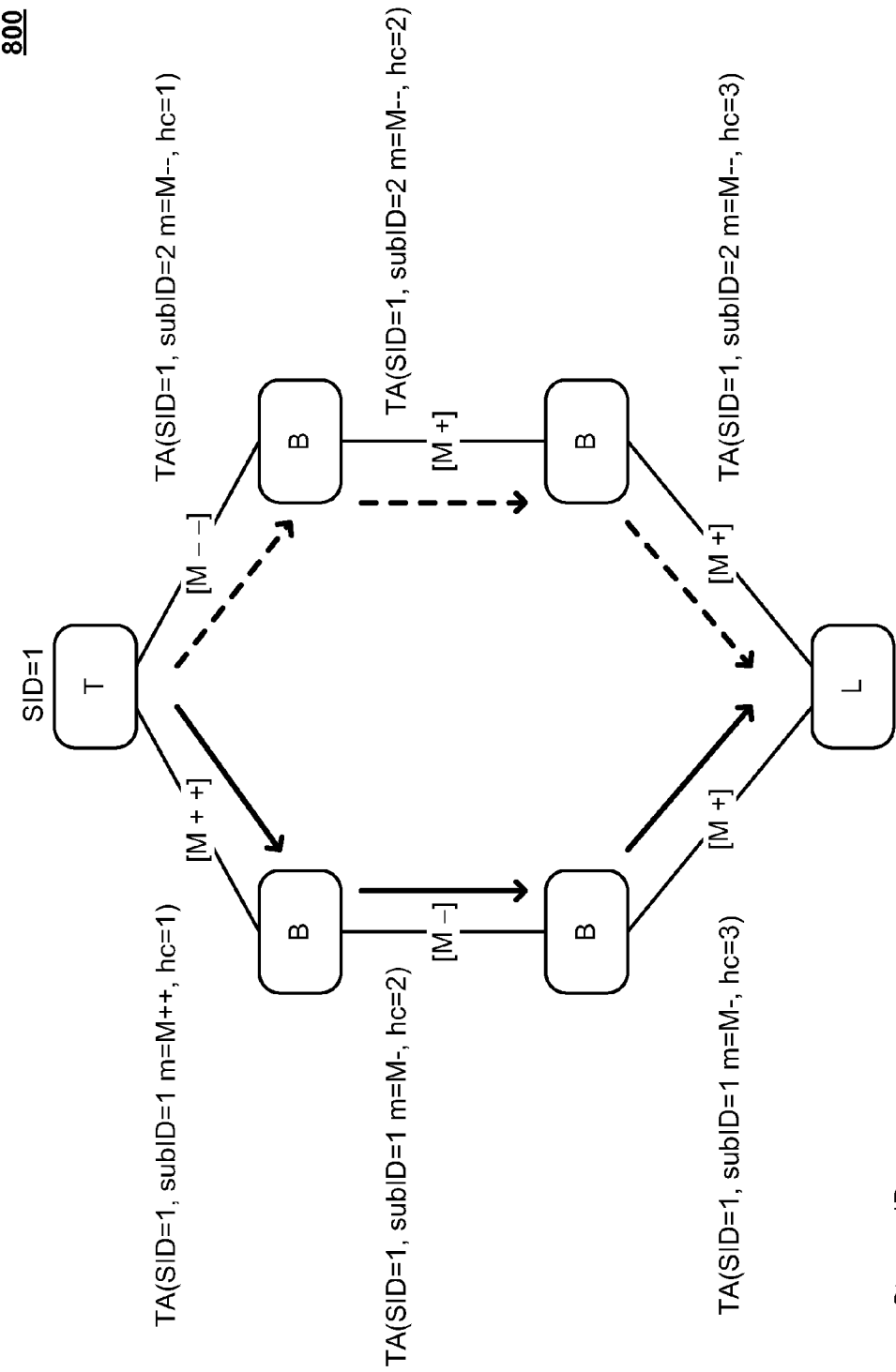
FIG. 8 illustrates an embodiment employing multi-cast stream reservation protocol (MSRP) for selecting of a stream path within a convergent network.

FIG. 8 illustrates an embodiment 800 employing multicast stream reservation protocol (MSRP) for selecting of a stream path within a convergent network. A given topology of a convergent network may be determined in accordance with the various principles and aspects presented in accordance with the various subject matter incorporated herein by reference as indicated above.

Once such a topology of the convergent network is determined, advantage may be taken of all the paths offered by the given network topology beyond a single spanning tree. For example, within a given convergent network, a multiple spanning tree based on virtual local area networks (VLANs) applies to a managed network and may be difficult to apply to a plug and play configured network. In operation of a convergent network, it is preferable for operation of network configuration and connectivity to be nearly imperceptible to a user therein. For example, such network configuration and connectivity is ideally imperceptible to a user of one of the communication devices within the convergent network.

With respect to each of the respective communication links within the convergent network, an associated metric is associated therewith. A communication link, in this context, being a link between two respective communication devices within the convergent network with no other communication devices intervening there between. Form some perspectives, such a communication link, in this particular context, is a direct communication link between two respective communication devices within the convergent network.

In accordance with the overall topology of the convergent network (e.g., determined in accordance with convergent network topology discovery and mapping such as in accordance with the various subject matter incorporated herein by reference as indicated above), each respective communication link therein is characterized by at least one associated metric. The type of metrics that may be associated with a given metric may be varied. For example, a metric may be a delay, a packet error rate (PER), a link bit rate "stability", and/or any other desired metric. These metrics may be added to transmitter communication device (e.g., talker advertise) multi-cast stream reservation protocol data units (MSRPDUs) communicated within the communication system.

For example, these MSRPDUs are communicated among the various communication devices by advertising transmitter communication device (e.g., talker advertise) MSRPDUs over all the communication links within the convergent network. In some embodiments, the communication of these MSRPDUs is made outside the data SPT. The transmitter communication device (e.g., a talker) MSRPDU Metrics are demoted to any lower link metrics found allow a particular communication path to a receiver communication device (e.g., a listener). For example, when traversing a communication path between a two communication devices, it is the lowest metric associated with at least one of the communication links traversed along that communication path that is kept to characterize that particular communication path. Again, a communication path between two communication devices may traverse along multiple communication links there between (e.g., communication link 1 from communication device 1 to communication device 2, communication link 2 from communication device 2 to communication device 3, communication link 3 from communication device 3 to communication device 4, and so on). The relatively lowest metric, among all of the communication links corresponding to a given communication path, is the metric employed to characterize that communication path. From another perspective, the communication link having the relatively lowest metric may be that which characterizes a bottleneck via that particular communication path, and as such, it is that particular communication link that essentially serves to characterize the communication path.

When a particular communication device (e.g., a listener) receives multiple advertisement MSRPDUs corresponding respectively to different communication paths within the convergent network between two communication devices (e.g., a given signal could be received from a communication device via more than one communication path), the communication device is operative to select the most adequate communication path among multiple communication paths.

For example, if two communication paths may support communications between two communication devices, then one of those two communication paths may be selected as the communication path actually to effectuate those communications between the two communication devices. Generally speaking, given that the respective communication links of those two communication paths are known (e.g., via the topology of the overall convergent network), and given that each of those two communication paths are characterized (e.g., such that each communication path has at least one respective metric associated therewith), the communication path having the relatively best metric (e.g., relatively highest metric) may be selected to support communications between the two communication devices. From another perspective, the communication path having the least worst bottleneck for supporting communications between those two communication devices may be the one selected to support the communications (e.g., thereby providing the fastest/best service of those communications).

With respect to the characterization of the metric of a given communication path, a particular communication path maybe created by a MSRPDU listener ready transmitted from a first communication device (e.g., a listener communication device) to a second communication device (e.g., a talker communication device).

Considering the diagram of FIG. 8, advertisements from a given communication device (e.g., a talker, T) for a given stream are propagated along all of the communication path within the convergent network (beyond the data spanning tree). The advertising communication device (e.g., the talker advertise) carries the link metrics and the hop count. For example, in the diagram, it can be seen that the respective hops (corresponding to each respective communication link employed in a communication path between a first communication device [talker, T] and a second communication device [listener, L]). When a given communication link along a particular communication path is encountered as being relatively lower than the current metric associated with that communication path, the metric of the communication path is then replaced with that new metric (e.g., downgraded to the relatively lower metric). For example, even though certain of the respective communication link along the communication path indicated by the solid lines (e.g., left hand side of the diagram) are + or ++ (e.g., on a scale where ++ being relatively better than +, + being relatively better than –, and – being relatively better than ––), if one of the communication links along that communication pathway is relatively lower, then the relatively lowest metric is that which is used to characterize the communication path. For example, with respect to the communication path indicated by the solid lines (e.g., left hand side of the diagram), the finalized metric associated therewith is "–". In comparison, with respect to the communication path indicated by the dashed lines (e.g., right hand side of the diagram), the finalized metric associated therewith is "––". As such, the communication path indicated by the solid lines (e.g., left hand side of the diagram) would be deemed to be relatively better than the communication path indicated by the dashed lines (e.g., right hand side of the diagram).

FIG. 9A, FIG. 9B, FIG. 10, FIG. 11A, FIG. 11B, FIG. 12, and FIG. 13 illustrate various other embodiments employing MSRP for selecting of a stream path within a convergent network.

Figure 9:
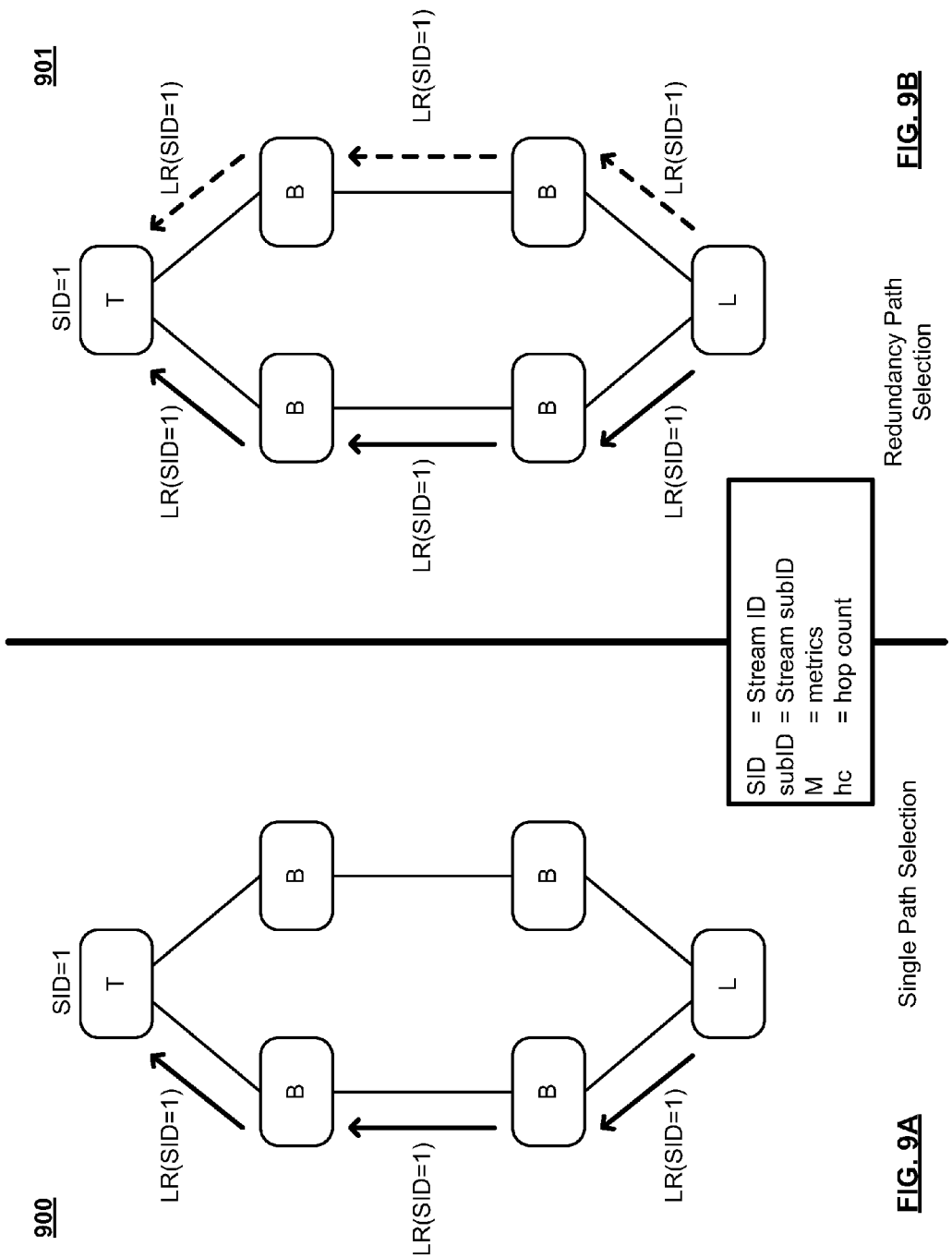
FIG. 9A, FIG. 9B, FIG. 10, FIG. 11A, FIG. 11B, FIG. 12, and FIG. 13 illustrate various other embodiments employing MSRP for selecting of a stream path within a convergent network.

Referring to the embodiment 900 of FIG. 9A, one communication path from among two or more communication paths is selected by a receiver communication device (e.g., listener, L) when propagating communications back in accordance with listener ready to an original transmitter communication device (e.g., to the talker, T). The diagram of this embodiment 900 shows a situation in which only one communication path being employed for supporting communications from the communication device (e.g., listener, L) to the communication device (e.g., to the talker, T).

Referring to the embodiment 901 of FIG. 9B, the diagram of this embodiment 900 shows a situation in which at least two communication paths can be employed for supporting communications from the communication device (e.g., listener, L) to the communication device (e.g., to the talker, T). Such an embodiment 901 corresponds to redundancy path selection in which at least two communication paths can support communications between the respective two communication devices.

Figure 10:
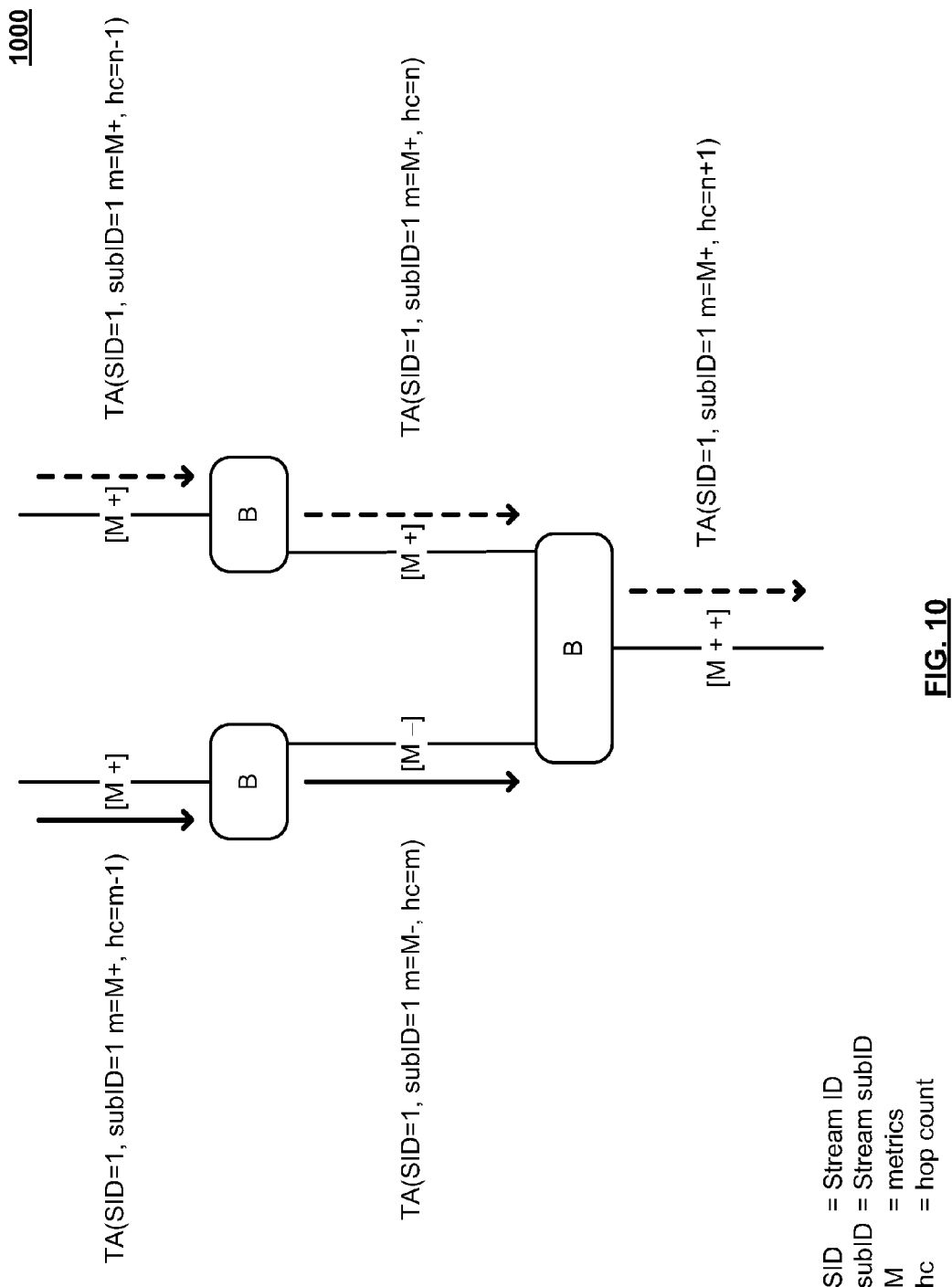

Referring to the embodiment 1000 of FIG. 10, when a bridge communication device receives multiple talker advertisements from different upstream bridges, the talker advertisement with the lowest metrics or highest hop counts may be dropped. For example, with respect to this diagram, the communication path indicated by the solid lines (e.g., left hand side of the diagram) is dropped in favor of the communication path indicated by the dashed lines (e.g., right hand side of the diagram).

Figure 11:
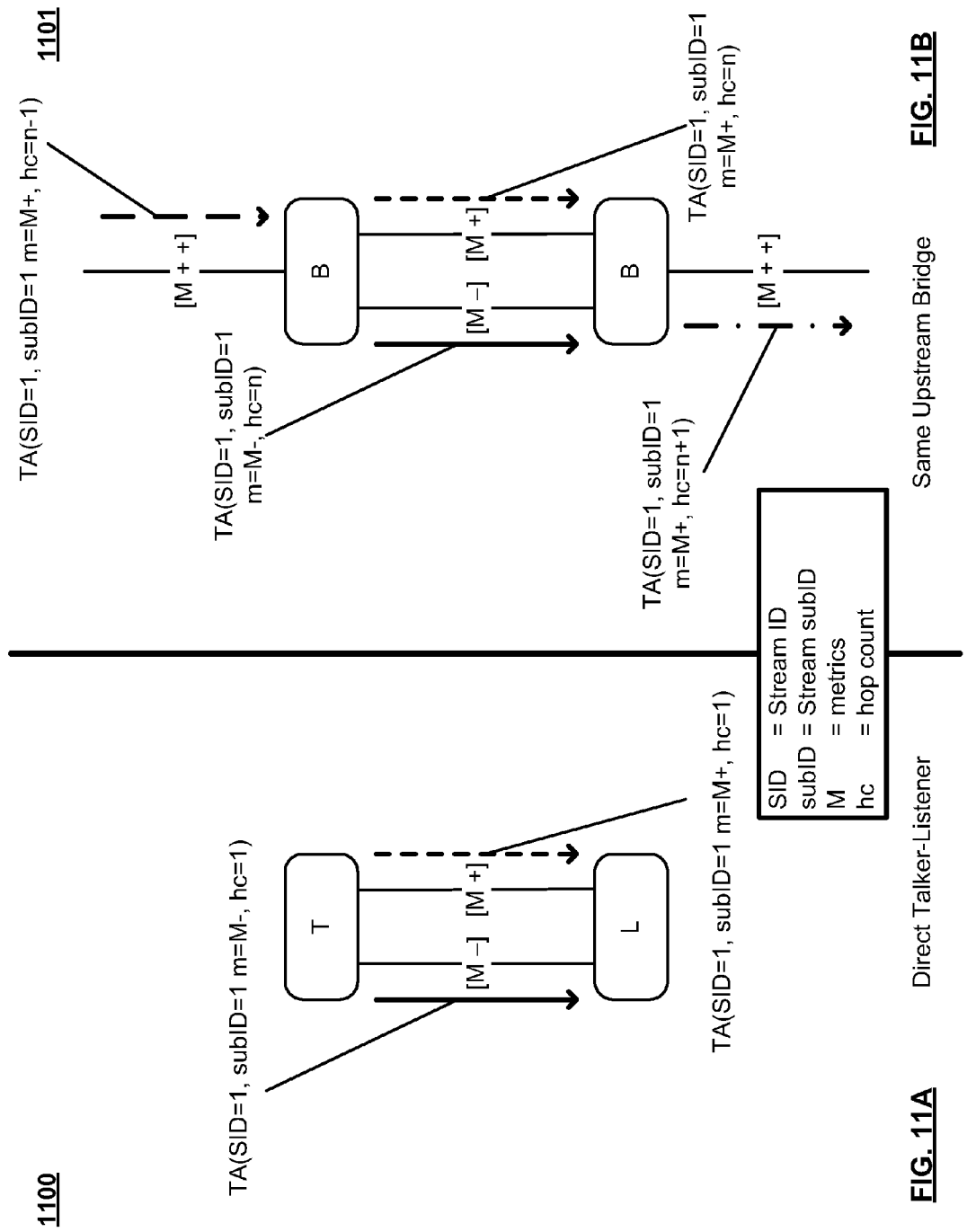

Referring to the embodiment 1100 of FIG. 11A, this diagram shows the associated metrics related to more than one communication link between two communication devices (e.g., two concurrent communication links between communication device (e.g., listener, L) and communication device (e.g., to the talker, T). When these two communication links are available, then metrics associated with each communication link, in a direct talker-listener embodiments, can be employed for making decisions regarding communications between the communication device (e.g., listener, L) and the communication device (e.g., to the talker, T).

Referring to the embodiment 1101 of FIG. 11B, this diagram shows a situation when a first bridge communication device is operative to receive multiple talker advertisements from a common/same, second upstream bridge, the talker advertisements are kept by the first bridge communication device.

Figure 12:
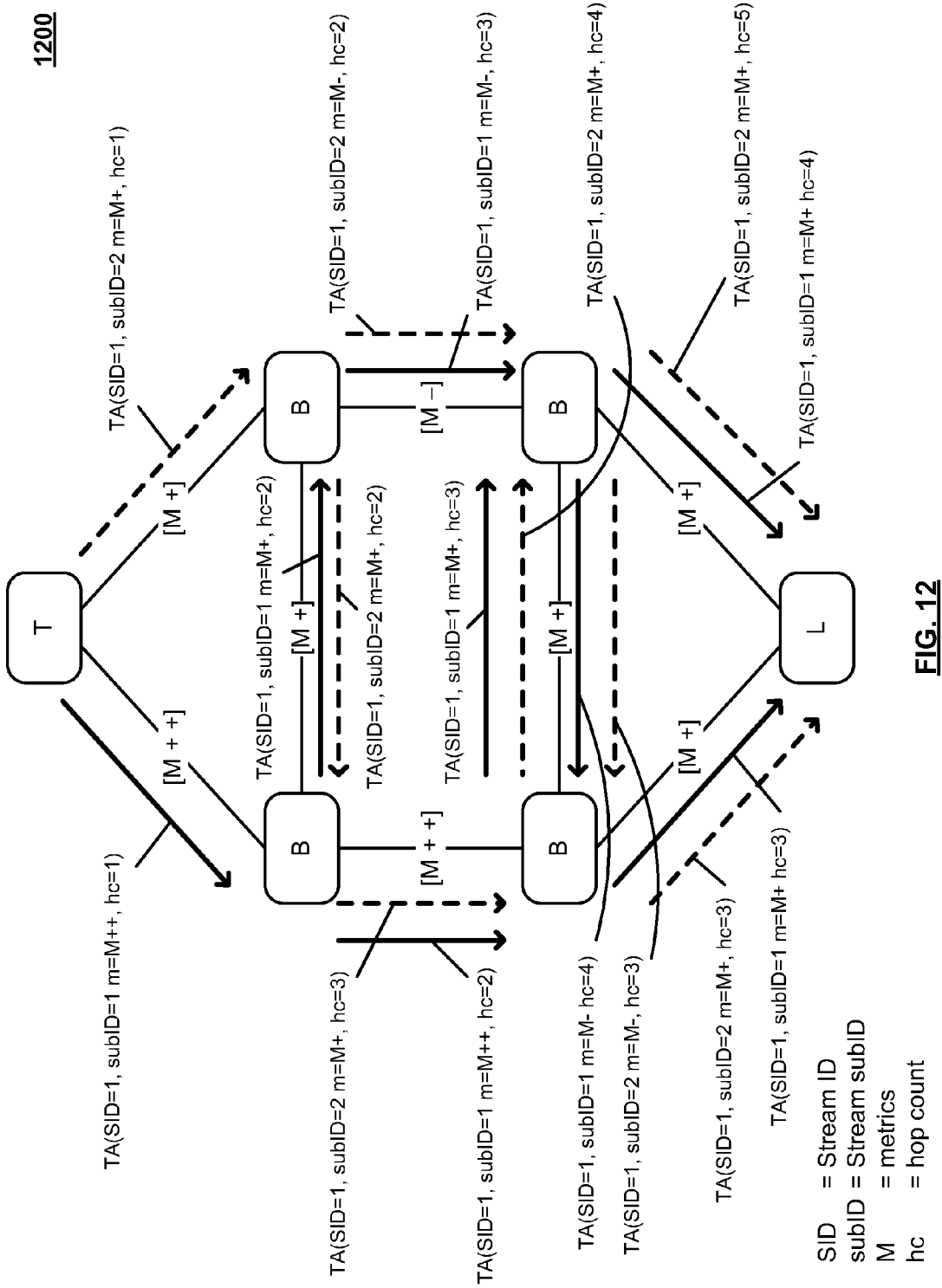

Referring to the embodiment 1200 of FIG. 12, this diagram shows an embodiment in which multiple bridges (shown as respective Bs) are implemented between a first communication device (e.g., listener, L) and a second communication device (e.g., to the talker, T).

Within a given convergent network, it is noted there may be some instances in which there may be a single point of failure with respect to various communication links among the overall convergent network. For example, while there may be some instances in which more than one path may exist by which communications may be made between a talker or source device and a listener or destination device, there may be some instances in which there may be a single point of failure. Of course, there will be certain instances in which there is not any single point of failure. Generally, various additional operations and/or modifications may be performed with respect to supporting redundancy in instances in which there may or may not be a single point of failure within the overall convergent network. For example, with respect to session relay protocol (SRP) talker advertise (TA), there may be appropriate modifications and/or enhancements with respect to communications made within such a convergent network.

For example, with respect to the talker advertise attributes, additional information beyond mere connectivity between various respective communication devices within an overall convergent network may be included. For example, certain new SRP talker advertise attributes may include source port identifier (ID) (e.g., which may correspond to either talker ports or any subsequent splitting bridge ports). For example, such a source port identifier may correspond to any one or more of an original talker or source device from which a communication is being provided and/or any intervening or middling node within the convergent network through which such communications are conveyed ultimately to a listener or destination device. Another SRP talker advertise attribute may correspond to one or more link costs (e.g., such as computed from one or more metrics) and/or one or more link metrics themselves. In addition, and SRP talker advertise attribute may correspond to indication of single egress, such as when implemented for redundancy without a single point of failure.

Generally speaking, it is noted that talker advertise messages may be flooded over every bridges egress port in certain instances. For example, loop detection may be effectuated by blocking duplicated talker advertise messages. When there are instances in which selection of one bridge among multiple bridges may be made for a given stream talker advertise, such selection may be based on any of a number of considerations. For example, such consideration may be made based on the source port and/or link cost (configurable computation)/metrics (configurable precedence). In some instances it is noted that both link cost and the single egress may be used as at least part of the basis by which such selection is made in an implementation and/or embodiment in which an operational mode associated with no single point of failure is selected.

Figure 13:
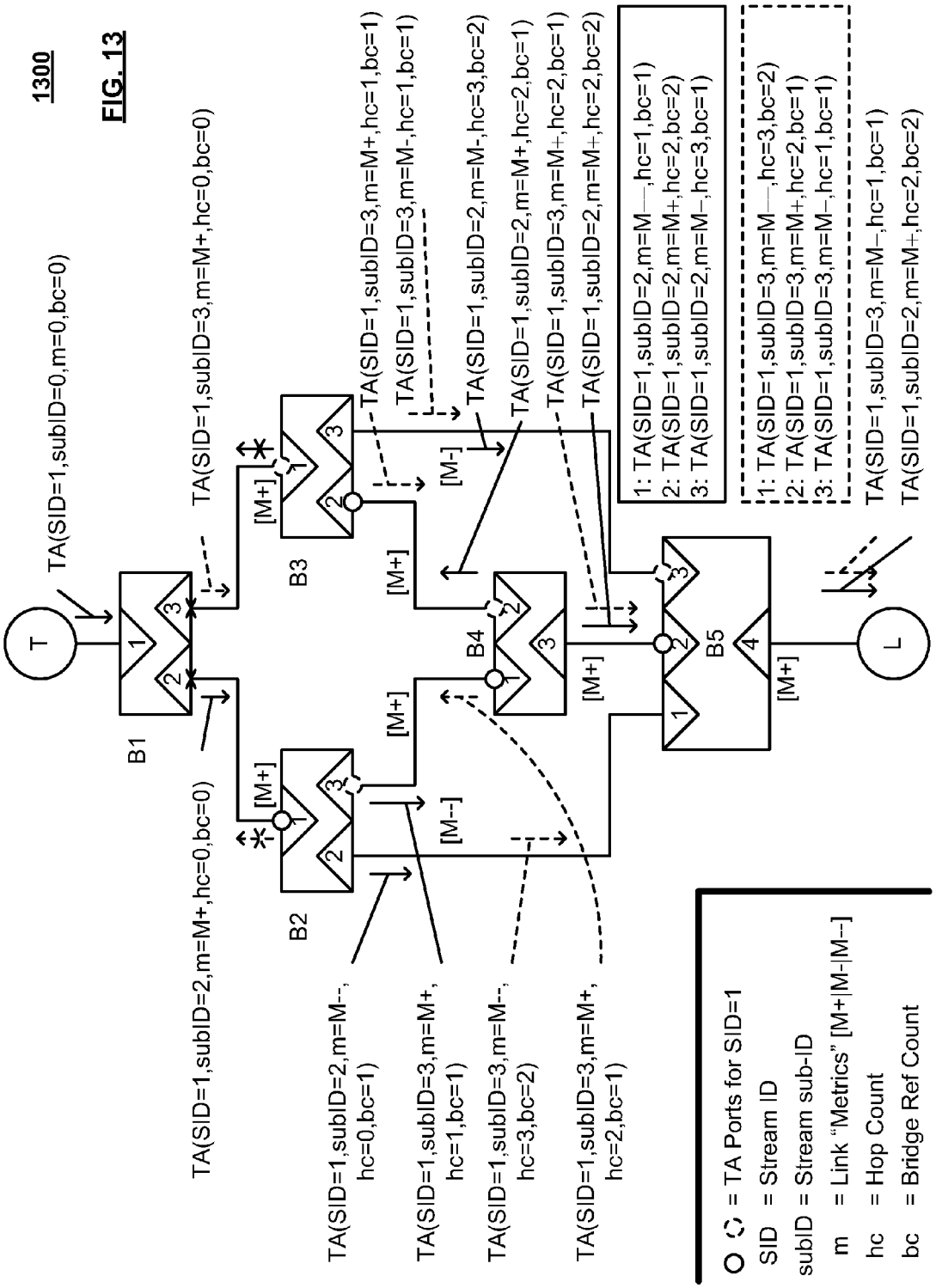

Referring to the embodiment 1300 of FIG. 13, this embodiment 1300 shows the use of multiple respective parameters to convey information in regards to various communication devices, ports on communication devices, communication links between respective communication devices, etc. For example, from certain perspectives, the usage of multi-cast stream reservation protocol (MSRP) (e.g., as defined in IEEE Std 802.1Q-2011) may be adapted and appropriately applied to provide support for redundancy and loop-free path selection beyond the limitation of spanning tree networks.

Such MSRP TA information may be propagated through all the possible paths offered by the topology. Such MSRP TA information may be propagated beyond a spanning tree generated in accordance with such describing such convergent networks. For example, for a given stream ID (shown as SID in the diagram), talker advertise (TA) communication (or generally referred to as TAs) are sent through different respective ports. For example, such TAs could either be sent from a talker communication device [e.g., T in the diagram] or from a first bridge "splitting" communication device, and the TAs are marked with a Stream SubID (or subStream ID, Stream sub-ID, or subID, or equivalent such as shown in the diagram) to differentiate these TAs.

Such TAs propagate link metrics may be accumulated and propagated along a given path. Any of a number of TAs propagate link metrics may be employed, including, though not limited to, lowest link max bandwidth, accumulated latency, accumulated hop count (e.g., incremented by each respective bridge across which a pathway crosses), highest reference count [alternative, highest ref count] (e.g., operative to indicate how many TAs with the same StreamID but different Stream SubID cross this particular bridge; such a reference count allows the listener [e.g., L in the diagram] to detect a path without any single point of failure (ref count=0)), link ref count (e.g., operative to indicate to the downstream bridge how many TAs with the same StreamID but different Stream SubIDs were propagated on this particular link), etc. and/or any other desired TA propagate link metric as may be desired in any of a number of different embodiments, implementations, architectures, etc.

With respect to effectuating loop protection, such TA communications may be implemented to include a sequence ID incremented by the Talker for each respective TA. A bridge communication device may be implemented to reject duplicated TAs received on a different port that the port registered for a given TA tuple such as {StreamID, Stream SubID, SEq ID}.

Downstream bridge communication devices may be implemented to eliminate duplicated TA with the same {StreamID, Stream SubID} based on any of a number of configurable criteria including though not limited to Path Metrics (e.g., which may include any one or more of a number of different criteria such as bandwidth, latency, link type, etc.), Bridge Reference count (e.g., such as related to single point of failure (SPF)), Hop Count, and/or any other desired configurable criteria as may be desired in any of a number of different embodiments, implementations, architectures, etc.

Listener communication devices may be implemented to receive multiple TAs for the same stream ID but for different Stream SubIDs, and any such listener communication device may be implemented to select the path(s) that that or those respective listener communication device(s) will register for this given stream by sending a Listener Ready (LR) communication along this/these selected path(s). In such an embodiment, the path selection is application specific based on the metrics and references provided by the TAs.

Referring to the embodiment 1300 of FIG. 13, this diagram shows such a novel and proposed scheme for a given stream as applicable to a convergent network.

1. Talker communication device (shown as T in the diagram): advertises Stream ID=1

2. Bridge communication device, B1: "splitting" bridge i.e. it propagates the TA through 2 different paths. The two TAs are differentiated by their respective Stream SubID's (e.g., respectively shown as solid and dotted lines, a convention employed throughout the diagram).

Please note: such "splitting" could be either done by a talker with multiple ports idea or a downstream bridge from the downstream topological point from where multiple paths are available.

3. Bridge communication device, B2: propagate the TA{1, 2} received on port [1] on every egress port [2,3] and the TA {1,3} received on port [3] on egress port [1,2] (regardless of the RSTP port state of the egress ports). Since the bridge forwards TAs with the same Stream ID but different Stream SubID, the bridge reference count is incremented to indicate a single point of failure (SPF).

4. Bridge communication device, B3: propagate the TA{1, 3} received on port [1] on every egress port [2,3] and the TA {1,2} received on port [3] on egress port [1,2] (regardless of the RSTP port state of the egress ports). Since the bridge forwards TAs with the same Stream ID but different Stream SubID, the bridge reference count is incremented to indicate a single point of failure.

5. Bridge communication device, B4: receives multiple TAs with the same stream ID but with different Stream SubIDs and propagates both on every egress port (regardless of the RSTP port state).

6. Bridge communication device, B5: receives multiple TAs with the same stream ID and the same Stream SubIDs. The bridge prunes these TAs by selecting which single TA will be propagated, based on configurable preference/selection between TA attributes: (link metrics, hop count, bridge ref count, etc.)

Please note: Such preference in terms of selection generally will be consistent across the convergent network, and such considerations may be viewed as being effectuated in accordance with a management issue. There are any of a number of ways to handle a given implementation in a desired or preferred embodiment. For example, such preference in terms of selection may be implemented in accordance with a default configuration (e.g., such that the preference is effectuated in accordance with a predetermined or default mode of operation). Alternatively, more than one or multiple preference sets may be selected by an additional stream parameter in order to keep flexibility and adaptability across a wide variety of application contexts (e.g., some streams could select one operational parameter or preference over others [e.g., could select bandwidth preference], while other streams could select another operational parameter or preference over others [e.g., could select latency preference] etc.).

Considering one particular implementation and application of the embodiment 1300, the bridge communication device B5 may be implemented to perform such selection as follows:

a. for TA {1,2}, the path with the best link metric over the bridge count and bridge reference count; and
b. for TA {1,3}, the path with the lowest hop count.

7. Listener communication device (shown as L in the diagram): receives multiple TAs and could select one or multiple TAs based on the application requirements and the attributes provided by the TAs. The listener communication device may communicate a listener ready (LR) communication to the talker communication device via the appropriately selected path such that the communication path via which the LR propagates will indicate to the talker communication device the selected path within the convergent network.

As may be seen with respect to this diagram an embodiment 1300, any of a number of different parameters may be used for path selection within a convergent network including a number of different respective communication links and pathways therein between a talker or source device and a listener destination device. As may be understood particularly, bridge reference count may be viewed as being but one of any of a number of possible parameters that may be used in accordance with such selection. In accordance with such reference count, it is noted that bridge reference count provides information to tell whether or not there is a single point of failure or not. For example, if a bridge to mediation device is shared by more than one respective paths associated with a common stream, then information may be provided to a listener communication device to assist that listener communication device in selecting a path within the convergent network. Also, another type of reference count may be characterized as being a link reference count. If a communication link is used by more than one stream, and such link reference count information may be provided for use in accordance with management issues.

Figure 14:
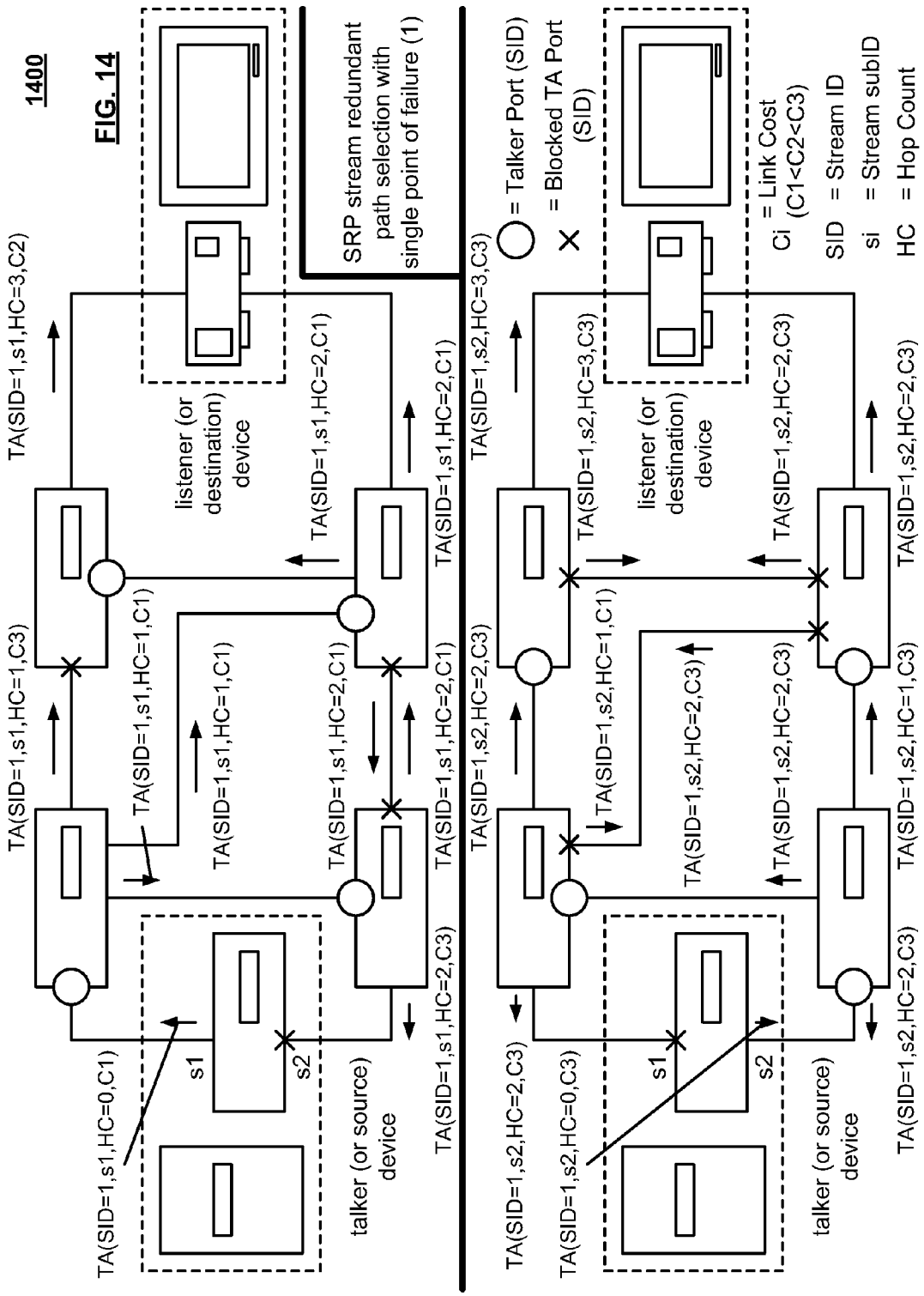
FIG. 14 and FIG. 15 illustrate various embodiments related to session relay protocol (SRP) stream redundant path selection with single point of failure.
Figure 15:
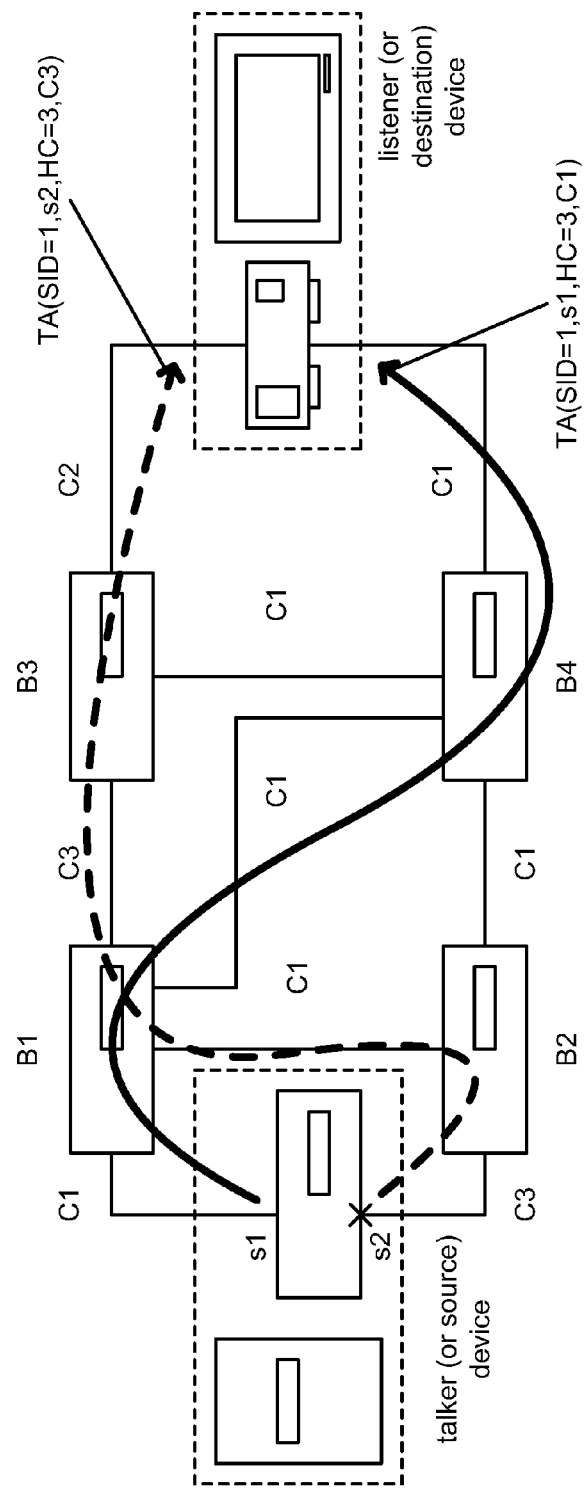

FIG. 14 and FIG. 15 illustrate various embodiments related to session relay protocol (SRP) stream redundant path selection with single point of failure.

Referring to embodiment 1400 of FIG. 14, as may be seen with respect to this diagram, a convergent network includes a talker or source device and a listener or destination device. Such a listener or destination device may be viewed as a set top box, audio and/or video receiver, etc. In some embodiments, such a listener or destination device may also include a video display such as a television of any desired type (e.g., widescreen, high-definition capable, and/or any other features, etc.).

As can be seen within the reference identifiers located on the lower right-hand portion of the diagram, talker port (SID), blocked talker advertise (TA) port (SID), link cost, stream ID, port ID, and hop count are as depicted within the diagram. As can be seen with respect to any given communication link within the overall convergent network, each respective communication link includes a number of attributes such as the talker or source device identifier itself, the port associated with the talker or source device, the number of hops associated with the communication link, and the respective and relative link cost of that link. As may be seen with respect to the indicia associated with a blocked TA port, there are certain paths by which communications may not be effectuated between the talker source device and the listener or destination device.

As may be seen by the differentiation between the top portion of the diagram in the bottom portion of the diagram, different respective TA ports are blocked in the respective top and bottom portions the diagram, and different respective talker ports are employed for the intervening, middling, or bridge devices implemented within the convergent network between the talker source device and the listener or destination device.

Referring to embodiment 1500 of FIG. 15, it can be seen that the communication link between the intervening, middling, or bridge devices B2 and B4, having a respective link cost of C1, corresponds to a single point of failure within the overall convergent network. There are at least two pathways through the overall convergent network by which redundancy may be achieved in supporting communications between the talker source device and the listener or destination device. As can be seen with respect to the two redundant pathways each respectively corresponding to multiple communication links through the overall convergent network, the source identifier and hop count of each is the same, yet the source port identifier and associated link costs are different. For example, given the relative link cost between C1, C2, and C3, it can be seen that the link cost associated with the dotted pathway, given that the respective pathway includes a communication link between the intervening, middling, or bridge devices B1 and B3 having an link cost of C3, the overall link cost of that respective pathway is also C3. However, the associated link cost with each of the three respective communication links or hops associated with the solid line pathway is C1, and the overall link cost of that respective pathway is consequently C1.

Figure 16:
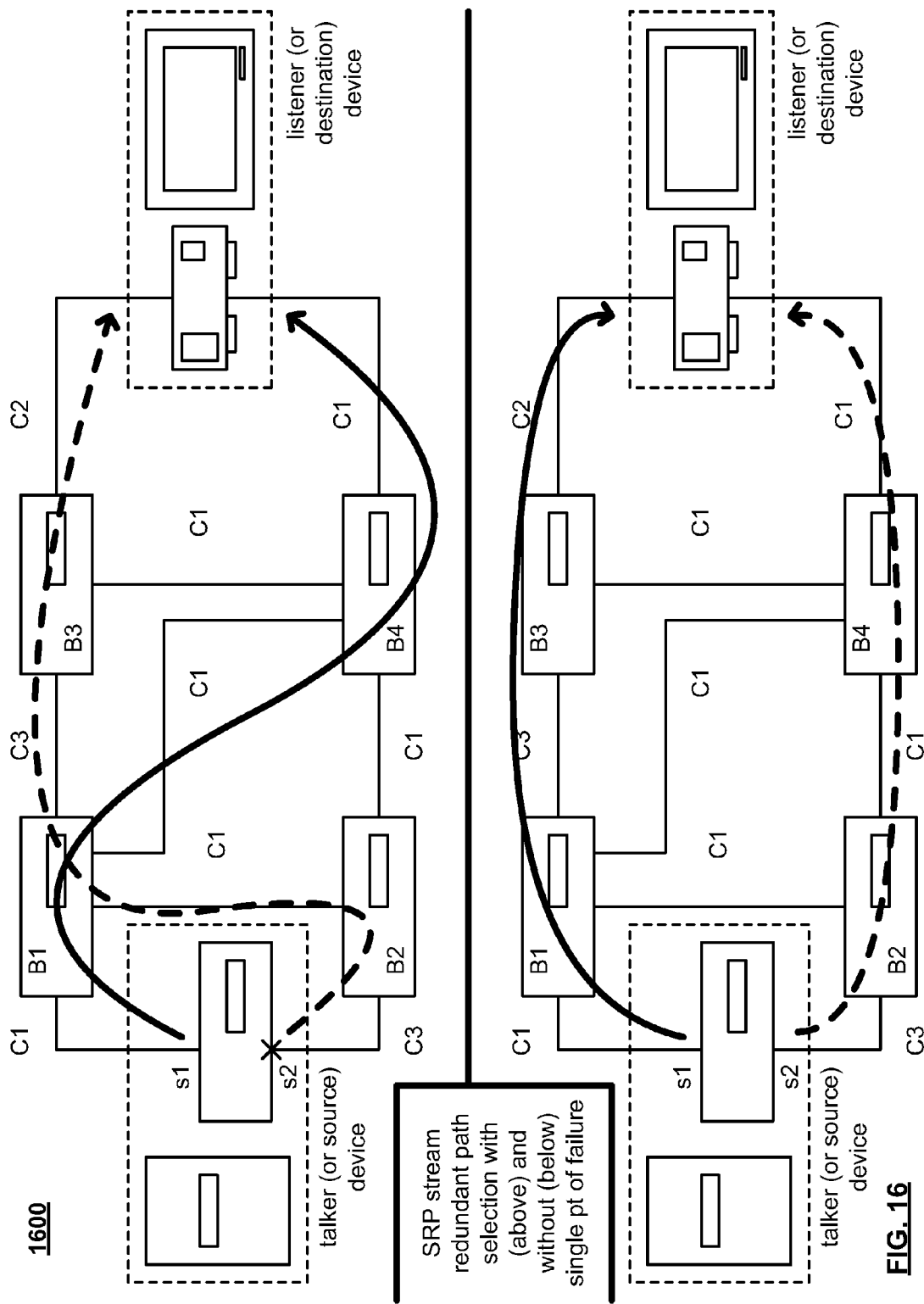
FIG. 16 illustrates an embodiment contrasting SRP stream redundant path selection with (above in the diagram) and without (below in the diagram) single point of failure.

FIG. 16 illustrates an embodiment 1600 contrasting SRP stream redundant path selection with (above in the diagram) and without (below in the diagram) single point of failure. In view of the operations and/or methodologies presented within the previous diagrams and/or embodiments, SRP stream redundant path selection is juxtaposed within this diagram. In the top portion of the diagram, SRP stream redundant path selection is made with a single point of failure within the overall convergent network. In the bottom portion of the diagram, SRP stream redundant path selection is made without a single point of failure within the overall convergent network.

As may be seen with respect to the solid line depicting one of the communication pathways in the top portion of the diagram, the link cost associated with is C1. It is noted that neither of the communication pathways depicted in the bottom portion of the diagram have a link cost as low as C1. As may be understood, there may be instances in which a more preferable communication pathway may be selected between a talker or source device and a listener or destination device within a convergent network that does not necessarily have a lowest effective link cost. However, it is noted that stream path selection may be viewed as being made with respect to multiple respective considerations, parameters, attributes, etc. There may be instances in which anyone of these respective considerations, parameters, attributes, etc. may not be perfect or ideal, yet when considered in totality, the respective selected stream path is nonetheless the most optimal within a given convergent network when considering such multiple considerations, parameters, attributes, etc.

FIG. 17A, FIG. 17B, FIG. 18A, and FIG. 18B illustrate various embodiment of methods for operating one or more devices within a convergent network.

Referring to method 1700 of FIG. 17A, via and input/output port of a first communication device, the method 1700 begins by receiving a plurality of messages, such that each of the plurality of messages associated with a respective at least one of a plurality of attributes and each of the plurality of messages also associated with a respective at least one of a plurality of communication links corresponding to a plurality of communication paths between the first communication device and a second communication device, as shown in a block 1710.

The method 1700 continues by processing the plurality of messages in accordance with selecting at least one of the plurality of communication pathways for supporting communications between the first communication device and the second communication device, as shown in a block 1720.

Referring to method 1701 of FIG. 17B, the method 1701 may be viewed as being performed within a listener or destination device. The method 1701 operates by receiving at least one talker advertise (TA) messaging session relay protocol data unit (MSRPDU) from a talker or source device, as shown in a block 1711. The method 1711 continues by processing the at least one TA MSRPDU in accordance with selecting at least one communication pathway for supporting communications between the talker or source device and the listener or destination device, as shown in a block 1721. Again, within a given convergent network, there may be multiple respective pathways by which communications may be supported between a talker or source device and a listener or destination device. A given communication pathway may be viewed as including multiple respective communication links or communication hops between multiple respective intervening or middling devices within the convergent network implemented between the talker or source device and the listener or destination device.

In certain embodiments, the method 1701 then operates by employing at least two selected communication pathways for jointly supporting redundant communications between the talker or source device and the listener destination device, as shown in a block 1731. For example, there may be instances in which more than one communication pathway may be jointly utilized in accordance with supporting redundant communications. As may be also understood with respect to the various embodiments and/or diagrams included herein, there may be some instances in which a single point of failure exists within the overall convergent network. Appropriate decision-making and/or operations may be performed based upon the existence or occurrence of a single point of failure within the overall convergent network. Such a single point of failure may be associated with unavailability of a port of a given device within the convergent network or a communication link within the overall convergent network.

Referring to method 1800 of FIG. 18A, the method 1800 may be viewed as being performed within a listener or destination device. The method 1800 operates by receiving at least one TA MSRPDU from a talker or source device, as shown in a block 1810. The method 1800 continues by processing the at least one TA MSRPDU in accordance with selecting at least one communication pathways for supporting communications between the talker source device and the listener or destination device, as shown in a block 1820.

The method 1800 then operates by transmitting at least one listener ready (LR) MSRPDU to the talker or source device thereby creating a communication path composed of multiple communication links between the talker or source device and the listener or destination device, as shown in a block 1830.

Referring to method 1801 of FIG. 18B, the method 1801 may be viewed as being performed within a listener or destination device. The method 1801 operates by receiving multiple TA MSRPDUs for a given stream through multiple ports, as shown in a block 1811. For example, as may be understood as respective convergent network, there may be multiple pathways by which a given stream may be provided to a given listener or destination device. There may be instances in which multiple, respective TA MSRPDUs may be received from multiple ports yet each of which is associated with the same stream.

The method 1801 then operates by analyzing one or more metrics associated with the respective multiple TA MSRPDUs in accordance with selecting one of the ports, as shown in a block 1821. For example, there may be multiple attributes associated with any given talker advertise, and consideration or attributes, metrics, characteristics, etc. may be used in selecting one of the ports.

From the listener or destination device, the method 1801 continues by transmitting at least one listener ready (LR) MSRPDU to the talker or source device, via the selected port, thereby creating a communication path composed of multiple communication links between the talker or source device and the listener or destination device, as shown in a block 1831.

In some embodiments, such a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing is performed wholly by a processing module (e.g., such as implemented within a singular device).

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
an input/output port configured to:
receive a plurality of messages, wherein each of the plurality of messages is associated with a respective at least one of a plurality of attributes that includes a respective one lowest metric associated with a respective one worst performing communication link within a respective one communication pathway of a plurality of communication pathways between the apparatus and at least one additional apparatus; and
transmit at least one additional message to the at least one additional apparatus; and
a processing circuit configured to:
process the plurality of messages to select at least one of the plurality of communication pathways for supporting the communications; and
generate the at least one additional message that indicates readiness of the apparatus to receive communications from the at least one additional apparatus and identifies the selected at least one of the plurality of communication pathways for supporting the communications, wherein the apparatus and the at least one additional apparatus are implemented within a convergent network that includes a plurality of bridges such that each of the plurality of communication links respectively connecting a respective two of a plurality of communication devices of the apparatus, the at least one additional apparatus, and the plurality of bridges and each of the plurality of communication pathways includes two or more of the plurality of communication links.

2. The apparatus of claim 1, wherein:
a first of the plurality of messages includes a first one lowest metric associated with a first one worst performing communication link of a first subset of the plurality of communication links that forms a first of the plurality of communication pathways between the apparatus and the at least one additional apparatus; and
a second of the plurality of messages includes a second one lowest metric associated with a second one worst performing communication link of a second subset of the plurality of communication links that forms a second of the plurality of communication pathways between the apparatus and the at least one additional apparatus.

3. The apparatus of claim 1, wherein the input/output port is further configured to:
receive firstly a first of the plurality of messages that includes a first one lowest metric associated with a first one worst performing communication link of a subset of the plurality of communication links that forms one of the plurality of communication pathways between the apparatus and the at least one additional apparatus; and
receive secondly a second of the plurality of messages, which is an updated version of the first of the plurality of messages, that includes a second one lowest metric associated with a second one worst performing communication link of the subset of the plurality of communication links that forms the one of the plurality of communication pathways between the apparatus and the at least one additional apparatus.

4. The apparatus of claim 1, wherein the plurality of messages includes a plurality of talker advertise (TA) messaging session relay protocol data units (MSRPDUs); and further comprising:

the input/output port configured to transmit at least one listener ready (LR) MSRPDU to the at least one additional apparatus.

5. The apparatus of claim 1, wherein the convergent network includes a combination of at least two respective network types corresponding to a wireless local area network (WLAN/WiFi), a multimedia over coax alliance (MoCA) network, a local area network (LAN), a HomePlug network, and a wireless point to point (P2P) system.

6. An apparatus comprising:
an input/output port configured to:
receive a first message that includes a first one lowest metric associated with a first one worst performing communication link of a first plurality of communication links that forms a first communication pathway between the apparatus and at least one additional apparatus within a convergent network;
receive a second message that includes a second one lowest metric associated with a second one worst performing communication link of a second plurality of communication links that forms a second communication pathway between the apparatus and at least one additional apparatus within the convergent network; and
support communications between the apparatus and the at least one additional apparatus; and
a processing circuit configured to process the first and second message to select the first communication pathway or the second communication pathway for the communications between the apparatus and the at least one additional apparatus.

7. The apparatus of claim 6, wherein the input/output port is further configured to:
receive a third message, which is an updated version of the first message, that includes a third one lowest metric associated with a third one worst performing communication link of the first plurality of communication links that forms the first communication pathway between the apparatus and at least one additional apparatus within the convergent network.

8. The apparatus of claim 7, wherein the processor is further configured to:
select firstly the first communication pathway for the communications between the apparatus and the at least one additional apparatus based on the first and second messages; and
select secondly the second communication pathway for the communications between the apparatus and the at least one additional apparatus based on the second and third messages.

9. The apparatus of claim 6, wherein the convergent network includes a plurality of bridges such that each of the plurality of communication links respectively connecting a respective two of a plurality of communication devices and the plurality of bridges.

10. The apparatus of claim 6, wherein:
the first message includes a first link cost, a first link metric, a first source port identifier, and first information that identifies the first plurality of communication links; and
the second message includes second link cost, a second first link metric, a second source port identifier, and second information that identifies the second plurality of communication links.

11. The apparatus of claim 10, wherein the input/output port is further configured to:
receive a third message from a first other apparatus located at a first middling node between the apparatus and at least one additional apparatus within the convergent network, wherein the third message is a first updated version of the first message and includes a third one lowest metric associated with a third one worst performing communication link of the first plurality of communication links that forms the first communication pathway between the apparatus and at least one additional apparatus within the convergent network; and
receive a fourth message from a second other apparatus located at a second middling node between the apparatus and at least one additional apparatus within the convergent network, wherein the fourth message is a second updated version of the first message and includes a fourth one lowest metric associated with a fourth one worst performing communication link of the first plurality of communication links that forms the first communication pathway between the apparatus and at least one additional apparatus within the convergent network.

12. The apparatus of claim 6, wherein the plurality of messages includes a plurality of talker advertise (TA) messaging session relay protocol data units (MSRPDUs); and further comprising:
the input/output port configured to transmit at least one listener ready (LR) MSRPDU to the at least one additional apparatus.

13. The apparatus of claim 6, wherein the convergent network includes a combination of at least two respective network types corresponding to a wireless local area network (WLAN/WiFi), a multimedia over coax alliance (MoCA) network, a local area network (LAN), a HomePlug network, and a wireless point to point (P2P) system.

14. A method for execution by a communication device, the method comprising:
receiving a first message that includes a first one lowest metric associated with a first one worst performing communication link of a first plurality of communication links that forms a first communication pathway between the apparatus and at least one additional apparatus within a convergent network;
receiving a second message that includes a second one lowest metric associated with a second one worst performing communication link of a second plurality of communication links that forms a second communication pathway between the apparatus and at least one additional apparatus within the convergent network;
processing the first and second message to select the first communication pathway or the second communication pathway for the communications between the communication device and the at least one additional communication device; and
supporting communications between the communication device and the at least one additional communication device.

15. The method of claim 14 further comprising:
receiving a third message, which is an updated version of the first message, that includes a third one lowest metric associated with a third one worst performing communication link of the first plurality of communication links that forms the first communication pathway between the apparatus and at least one additional apparatus within the convergent network.

16. The method of claim 15 further comprising:
firstly selecting the first communication pathway for the communications between the communication device and the at least one additional communication device based on the first and second messages; and secondly selecting the second communication pathway for the communications between the communication device and the at least one additional communication device based on the second and third messages.

17. The method of claim 14, wherein the convergent network includes a plurality of bridges such that each of the plurality of communication links respectively connecting a respective two of a plurality of communication devices the plurality of bridges.

18. The method of claim 14, wherein:
the first message includes a first link cost, a first link metric, a first source port identifier, and first information that identifies the first plurality of communication links; and
the second message includes second link cost, a second first link metric, a second source port identifier, and second information that identifies the second plurality of communication links.

19. The method of claim 14, wherein the plurality of messages includes a plurality of talker advertise (TA) messaging session relay protocol data units (MSRPDUs); and further comprising:
transmitting at least one listener ready (LR) MSRPDU to the at least one additional communication device.

20. The method of claim 14, wherein the a convergent network includes a combination of at least two respective network types corresponding to a wireless local area network (WLAN/WiFi), a multimedia over coax alliance (MoCA) network, a local area network (LAN), a HomePlug network, and a wireless point to point (P2P) system.

* * * * *